No. 843,531. PATENTED FEB. 5, 1907.
J. D. HARPER.
EYEGLASSES AND SPECTACLES.
APPLICATION FILED JULY 23, 1904.
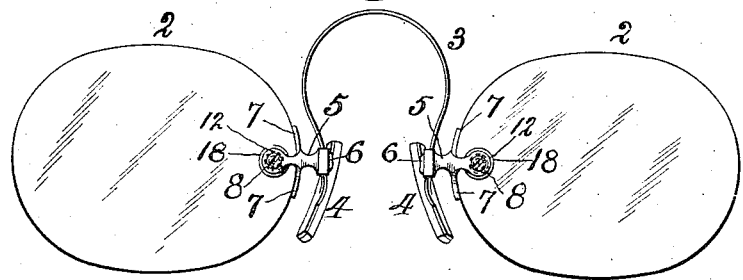
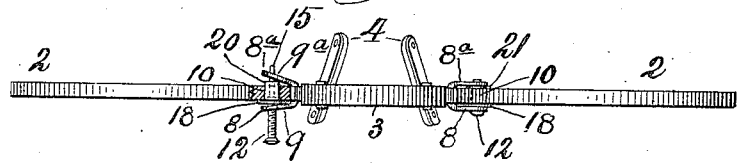
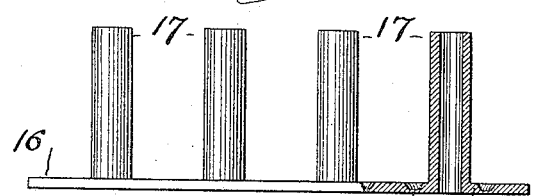
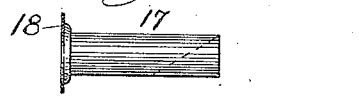
Witnesses
Edgeworth Greene
Mortimer Mahony
John Dixon Harper, Inventor
By his Attorney H. A. West
THE NORRIS PETERS CO., WASHINGTON, D. C.

UNITED STATES PATENT OFFICE.

JOHN DIXON HARPER, OF NEW YORK, N. Y., ASSIGNOR TO THE HARPER OPTICAL COMPANY, A CORPORATION OF NEW YORK.

EYEGLASSES AND SPECTACLES.

No. 843,531.  Specification of Letters Patent.  Patented Feb. 5, 1907.

Application filed July 23, 1904. Serial No. 217,859.

*To all whom it may concern:*

Be it known that I, JOHN DIXON HARPER, a citizen of the United States, and a resident of New York, in the county of New York and State of New York, have invented certain new and useful Improvements in Eyeglasses and Spectacles, of which the following is a specification.

My invention relates to so-called "frameless" eyeglasses and spectacles; and the object of my invention is to devise mountings for the lenses which to a very large degree obviates the danger of breaking the lenses in the work of applying the mountings and which greatly facilitates this work of the optician and which at the same time largely overcomes the difficulty in use due to the loosening and breaking of the lenses.

The invention consists in the construction, arrangement, and combination of parts as hereinafter described.

In the accompanying drawings, to which reference is made and which form a part of this specification, Figure 1 is a front elevation of a pair of eyeglasses mounted in accordance with my invention. Fig. 2 is a plan view of the same, a portion of one lens being broken away. Fig. 3 is an enlarged sectional elevation of a sheet of tubes used in mounting the lenses. Fig. 4 is an enlarged plan view of one of said tubes, and Fig. 5 is an enlarged view of one of the screws used in the mountings.

In the drawings, 2 2 designate the lenses of rimless eyeglasses, 3 the nose-spring, and 4 4 the nose-guards, the nose-spring and nose-guards being shown connected to the studs 5 5 by the stud-screws 6 6 in the usual well-known manner.

Each stud 5 is formed or provided with stays 7 7 for the edge of the lens and with ears or cheek-pieces 8 $8^a$, which embrace the sides of the lens, the cheek-pieces being formed with orifices 9 $9^a$, which correspond with an orifice 10 in the lens. One of the orifices—say $9^a$—is internally screw-threaded to receive the screw 12 for clamping the cheek-pieces upon the lens. The screw 12 is formed with a head 13, is screw-threaded, as shown in Fig. 5, and is formed beyond the screw-thread with a reduced extension 15.

16 designates a sheet of soft india-rubber formed with a series of tubes 17, the tubes being, by preference, molded to form an enlargement 18, which, by preference, is made integral with the sheet 16 by a surrounding film 19 of india-rubber of less strength than the head and of less strength than the surrounding india-rubber. The tubes are to be separated from the sheet by pulling or tearing them off or otherwise, each tube when separated being provided with the enlargement 18, as shown in Fig. 4.

The cheek-pieces 8 $8^a$ are pliable and are to be bent apart before the edge of the lens is put in place between them. This is particularly necessary when the lens is a thick one or when the lens is a minus or concaved lens which is thickest at the edge. When the lens is put in place, the reduced and smooth extension 15 of the screw is inserted through the orifices in the cheek-pieces and the orifice in the lens, and then by means of pliers the cheek-pieces are squeezed down against the surfaces of the lens. In thus squeezing down the cheek-pieces they slide along the extension 15 of the screw, which causes the orifices in the cheek-pieces to accurately register with each other and with the orifice in the lens, so that no difficulty will be experienced in starting the thread of the screw in the thread $9^a$ of the cheek-piece $8^a$, and since the three orifices are guided into line by the extension 15 of the screw no lateral or breaking strain comes upon the lens in the act of turning down the screw.

In uniting the metal mountings and the lenses the cheek-pieces are first spread by means of pliers or otherwise, as shown at the left in Fig. 2. A tube 17 is then inserted in the orifice in the lens and drawn through until the enlargement 18 comes flat against the adjacent surface of the lens. In inserting the tube I prefer to diagonally cut off the end, as shown in dotted lines in Fig. 4, thus forming a point which by pinching the tube may be easily threaded through the orifice in the lens. When the tube has been drawn into the orifice in the lens up to the enlargement 18, the protruding end of the tube is cut off, leaving a short length to project beyond the surface of the lens, as shown at 20 in Fig. 2. The lens thus equipped with the tube headed on one end is placed between the cheek-pieces and the extension 15 inserted through the plain orifice 9 in the cheek-piece 8, through the orifice in the tube, and through the threaded orifice $9^a$ in the cheek-piece $8^a$.

This can be easily done and without pushing the soft india-rubber tube through the orifice in the lens, owing to the fact that the extension 15 is of reduced diameter and smooth on its surface. The extension 15 of the screw being thus inserted, as shown at the left in Fig. 2, the cheek-pieces of the mounting are squeezed down firmly against the ends of the tube, spreading the protruding end 20 of the tube—uniformly spreading it out all around the extension 15 into a flat head 21 against the adjacent surface of the lens. In thus squeezing down the cheek-pieces the extension 15 can be relied upon to accurately register the orifices without paying any special attention to the work and without any danger of breaking the lens, and, furthermore, no special attention need be paid to the amount of pressure applied in squeezing down the cheek-piece, for no pressure within reasonable bounds will crack the lens. The cheek-pieces being thus squeezed down and the orifices registered by the extension 15, the screw is turned home and the extension nipped off with pliers.

I am aware that prior to my invention frameless eyeglass-mountings had been provided with short india-rubber tubes, as shown in the patent to Adam Licht, No. 631,170, granted August 15, 1899, which was assigned to me; but with the construction covered by said patent much difficulty is experienced in putting the parts together, because there were no means for preventing the end of the india-rubber tube from being pushed wholly into the orifice in the lens. If the opening through the india-rubber tube is not less in diameter than the diameter of the screw, it has no practical efficiency, and experience shows that the usefulness of the device is much impaired by the time it takes to properly confine the tube. By my invention I overcome these difficulties and give the tube a firm and reliable resistance to the thrust of the screw and insuring a perfect head or washer between each of the cheek-pieces and the surfaces of the lens.

It will be understood while I have not shown views of frameless spectacles in the drawings that my invention is equally applicable to mountings for the temples and for the stiff bridges of spectacles and that therefore my invention applies to spectacles as well as to eyeglasses.

Having thus described my invention, what I claim as new, and desire to secure by Letters Patent, is—

A lens having an orifice therein, an elastic tube having a permanent head on one of its ends inserted in the said orifice and snugly fitting the same, the said tube being longer than the thickness of the lens, and said head being larger than the orifice in the lens, a metal mounting having apertured cheek-pieces to embrace the sides of the lens and to bind the head of the said tube against the lens, one of said apertures being screw-threaded, and a screw having a smooth extension at its end of less diameter than the apertures in said cheek-pieces and inserted through one of the cheek-pieces, through the elastic tube and through the opposite cheek-piece and screwed down therein, substantially as described.

JOHN DIXON HARPER.

Witnesses:
H. ALBERTUS WEST,
MORTIMER MAHONY.